(12) United States Patent
Suzuki

(10) Patent No.: US 6,810,762 B2
(45) Date of Patent: Nov. 2, 2004

(54) GEAR CHANGE DEVICE

(75) Inventor: Michinobu Suzuki, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 122 days.

(21) Appl. No.: 10/171,610

(22) Filed: Jun. 17, 2002

(65) Prior Publication Data

US 2002/0189388 A1 Dec. 19, 2002

(30) Foreign Application Priority Data

Jun. 18, 2001 (JP) .......................................... 2001-183470

(51) Int. Cl.[7] .......................... F16H 59/02; B60K 17/00
(52) U.S. Cl. ..................... 74/473.3; 74/473.12; 74/335; 74/473.21
(58) Field of Search .............................. 74/473.12, 335, 74/473.1, 467, 473.21, 473.3, 473.33, 473.36

(56) References Cited

U.S. PATENT DOCUMENTS

| | | | |
|---|---|---|---|
| 2,895,090 A | 7/1959 | Short | |
| 4,567,969 A | 2/1986 | Makita | 192/3.56 |
| 4,638,690 A | 1/1987 | Hattori et al. | |
| 4,727,764 A * | 3/1988 | Klaue | 74/331 |
| 4,860,792 A | 8/1989 | Ichihashi et al. | 137/596.17 |
| 5,191,804 A | 3/1993 | Genise | 74/335 |
| 5,241,292 A | 8/1993 | Bjorknas et al. | 335/256 |
| 5,460,060 A | 10/1995 | Nellums | |
| 5,471,893 A | 12/1995 | Newbigging | 74/335 |
| 5,590,563 A * | 1/1997 | Kuwahata et al. | 74/337.5 |
| 5,689,997 A | 11/1997 | Schaller | 74/335 |
| 5,743,143 A | 4/1998 | Carpenter et al. | 74/335 |
| 5,762,580 A * | 6/1998 | Walega et al. | 477/130 |
| 5,979,261 A | 11/1999 | Dorfschmid et al. | |
| 5,992,254 A * | 11/1999 | Machado | 74/335 |
| 5,992,267 A * | 11/1999 | Smith et al. | 74/745 |
| 6,382,042 B1 | 5/2002 | Bovina et al. | 74/337.5 |
| 6,559,746 B2 | 5/2003 | Takanashi et al. | |
| 6,634,249 B2 * | 10/2003 | Yamamoto | 74/473.12 |
| 2002/0096008 A1 | 7/2002 | Yamamoto | |
| 2002/0189388 A1 | 12/2002 | Suzuki | |
| 2003/0061891 A1 | 4/2003 | Yamamoto et al. | |
| 2003/0074998 A1 | 4/2003 | Esly et al. | 74/473.12 |

FOREIGN PATENT DOCUMENTS

| | | |
|---|---|---|
| EP | 1 225 373 A2 | 7/2002 |
| GB | 1 480 802 | 7/1977 |
| RU | 4612182 | 5/1993 |

OTHER PUBLICATIONS

Bruno Lequesne; "Fast–Acting Long–Stroke Bistable Solenoids with Moving Permanent Magnets"; IEEE Transactions on Industry Applications, vol. 26, No. 3, May/Jun. 1990.
European Search Report dated Dec. 12, 2003.

* cited by examiner

Primary Examiner—David A. Bucci
Assistant Examiner—Julie K. Smith
(74) Attorney, Agent, or Firm—James N. Dresser, Esq.

(57) ABSTRACT

A gear change device comprising a select actuator for actuating a shift lever in the direction of selection and a shift actuator for actuating the shift lever in the direction of shift, and the select actuator has a shift lever support mechanism arranged in a casing to support the shift lever in such a manner as to slide in the axial direction and to rotate, an electromagnetic solenoid for operating the shift lever in the axial direction which is the direction of selection, a select position-limiting mechanism for limiting the operation position of the shift lever according to the thrust produced in response to the amount of electric power fed to the electromagnetic coils of the electromagnetic solenoids, and the shift actuator works to turn the shift lever support mechanism in the direction of shift.

3 Claims, 4 Drawing Sheets (a)

(b)

(c)

GEAR CHANGE DEVICE

FIELD OF THE INVENTION

The present invention relates to a gear change device for shifting a transmission mounted on a vehicle.

DESCRIPTION OF THE RELATED ART

A gear change device for shifting a transmission comprises a select actuator for actuating a shift lever of a speed-changing mechanism in a direction of selection and a shift actuator for actuating the shift lever in a direction of shift.

As the select actuator and shift actuator, there are usually used fluid pressure cylinders using a fluid pressure such as pneumatic pressure or hydraulic pressure as a source of operation. The select actuator and the shift actuator employing the hydraulic cylinders require pipes for connecting the source of fluid pressure to each of the actuators, require electromagnetic change-over valves for changing over the flow passage of the operation fluid, and require space for arranging the above components, resulting in an increase in weight of the apparatus as a whole.

In recent years, a select actuator and a shift actuator constituted by electric motors have been proposed as a gear change device for a transmission mounted on a vehicle which is provided with neither the source of compressed air nor the source of hydraulic pressure. The select actuator and the shift actuator constituted by electric motors can be constituted in a compact size as a whole and in a reduced weight since they need neither the pipes for connection to the source of hydraulic pressure nor the electromagnetic change-over valve unlike the actuators that use hydraulic cylinders.

The actuators using electric motors require a speed reduction mechanism for obtaining a predetermined operation force. As the speed reduction mechanisms, there have been proposed the one using a ball-screw mechanism and the one using a gear mechanism. However, the actuators using the ball-screw mechanism and the gear mechanism are not necessarily satisfactory in regard to durability of the ball-screw mechanism and of the gear mechanism and in regard to durability and the operation speed of the electric motors. Besides, the select actuator must reliably bring the shift lever to a predetermined select position.

SUMMARY OF THE INVENTION

It is, therefore, an object of the present invention to provide a gear change device equipped with a select actuator, which exhibits excellent durability, operates at a high speed, and can reliably bring a shift Lever to a predetermined select position.

In order to accomplish the above-mentioned object according to the present invention, there is provided a gear change device comprising a select actuator for actuating a shift lever in the direction of selection and a shift actuator for actuating the shift lever in the direction of shift; wherein said select actuator comprises a cylindrical casing, a shift lever support mechanism arranged in said casing to support said shift lever in such a manner as to slide in the axial direction and to rotate, an electromagnetic solenoid for operating said shift lever in the axial direction which is the direction of selection, and a select position-limiting mechanism for limiting the operation position of the shift lever according to a thrust produced in response to the amount of electric power fed to the electromagnetic coils of said electromagnetic solenoids; and said shift actuator rotates said shift lever support mechanism in the direction of shift.

The shift lever support mechanism comprises a control shaft mounting the shift lever and a rotary shaft which is spline-fitted to said control shaft in a manner to slide in the axial direction and is rotatably supported by said casing.

It is desired that the select actuator is so constituted that the shift lever is brought to a select position of the first speed gear in a state where no electric current has been fed to the electromagnetic coils of the electromagnetic solenoids.

DETAILED DESCRIPTION OF THE PREFERRED EMBODIMENTS

The gear change device constituted according to the present invention will now be described in further detail with reference to the accompanying drawings illustrating a preferred embodiment of the invention.

Figure 1:
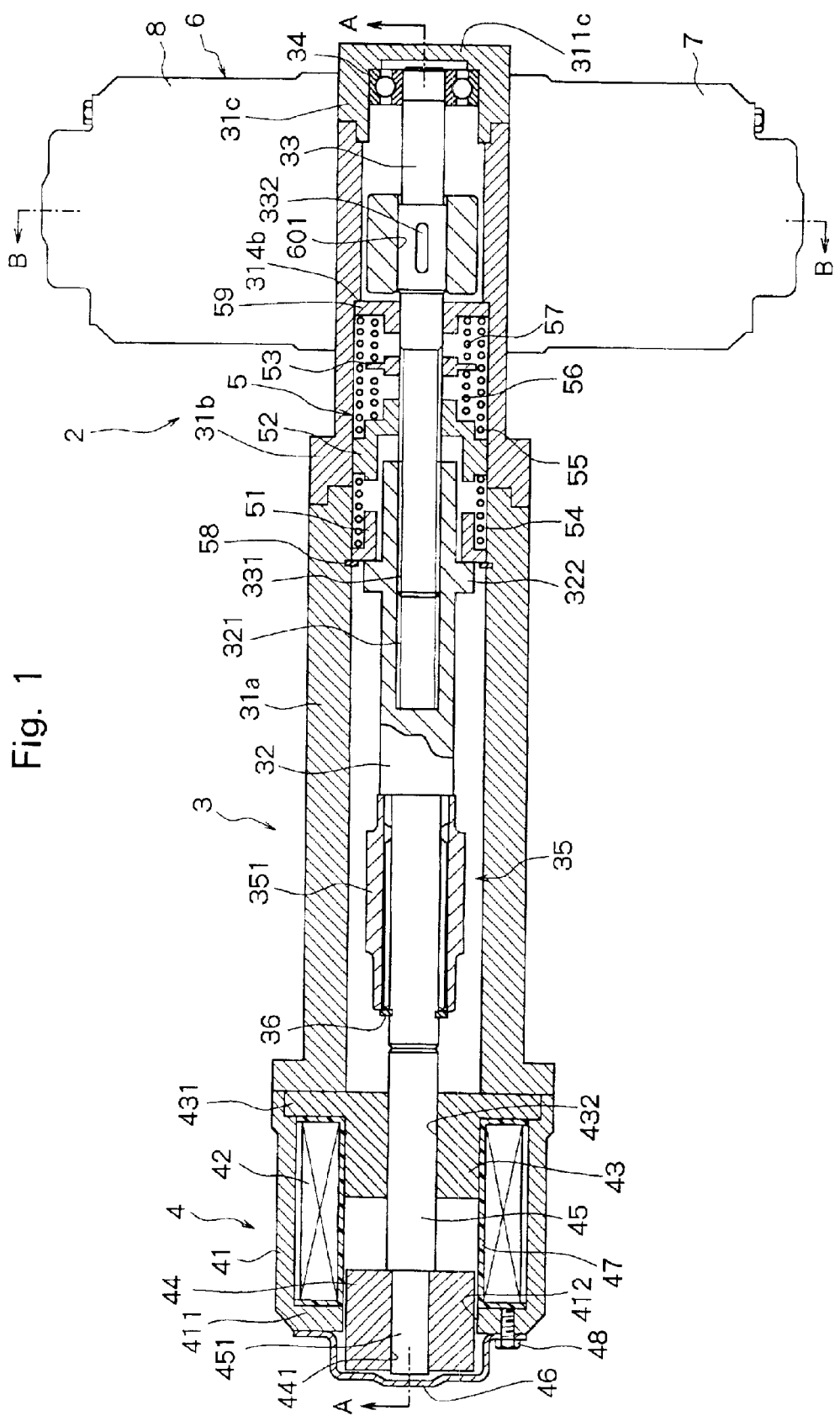
FIG. 1 is a sectional view illustrating an embodiment of a gear change device constituted according to the present invention.
Figure 2:
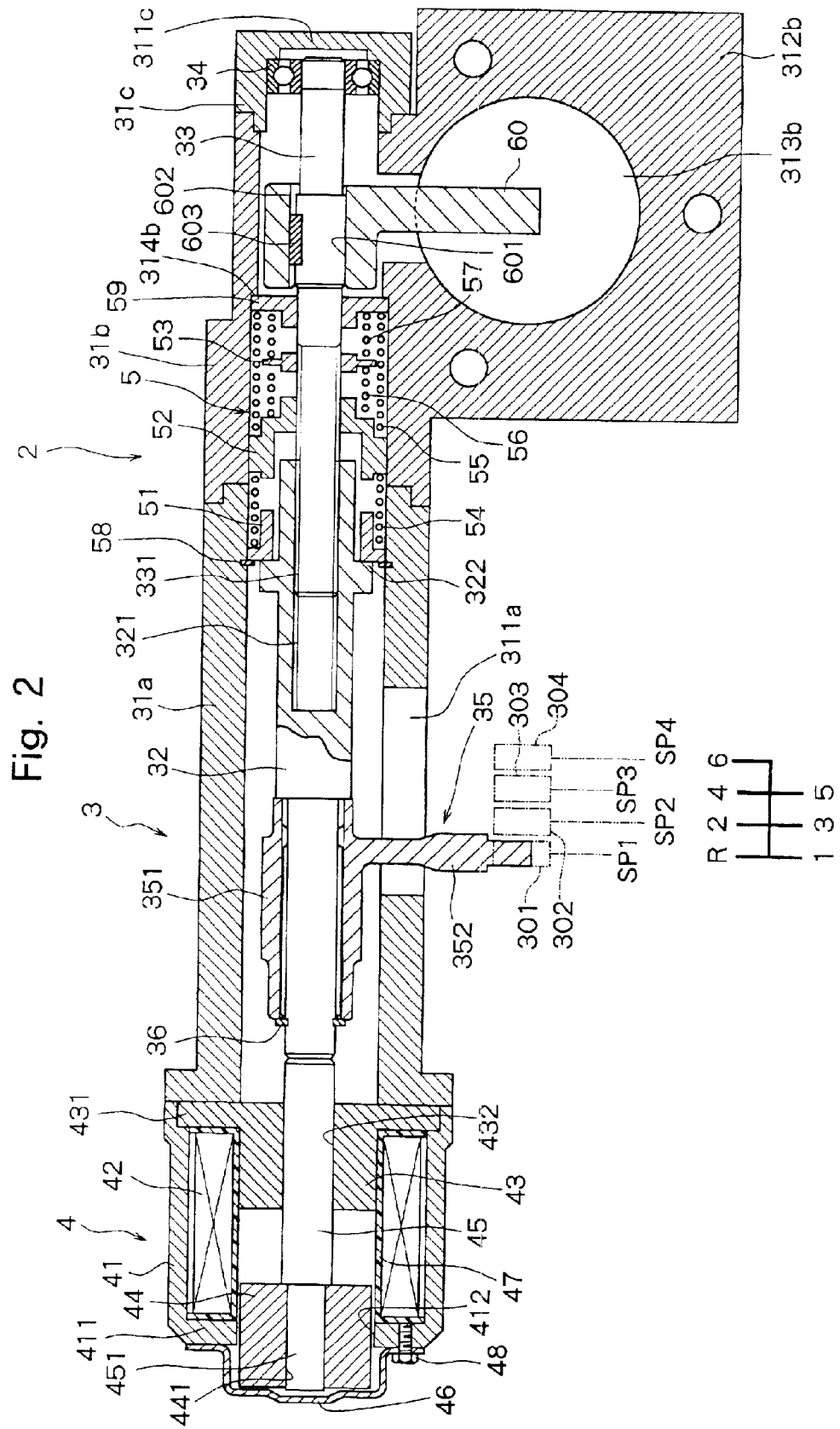
FIG. 2 is a sectional view along the line A—A in FIG. 1.
Figure 3:
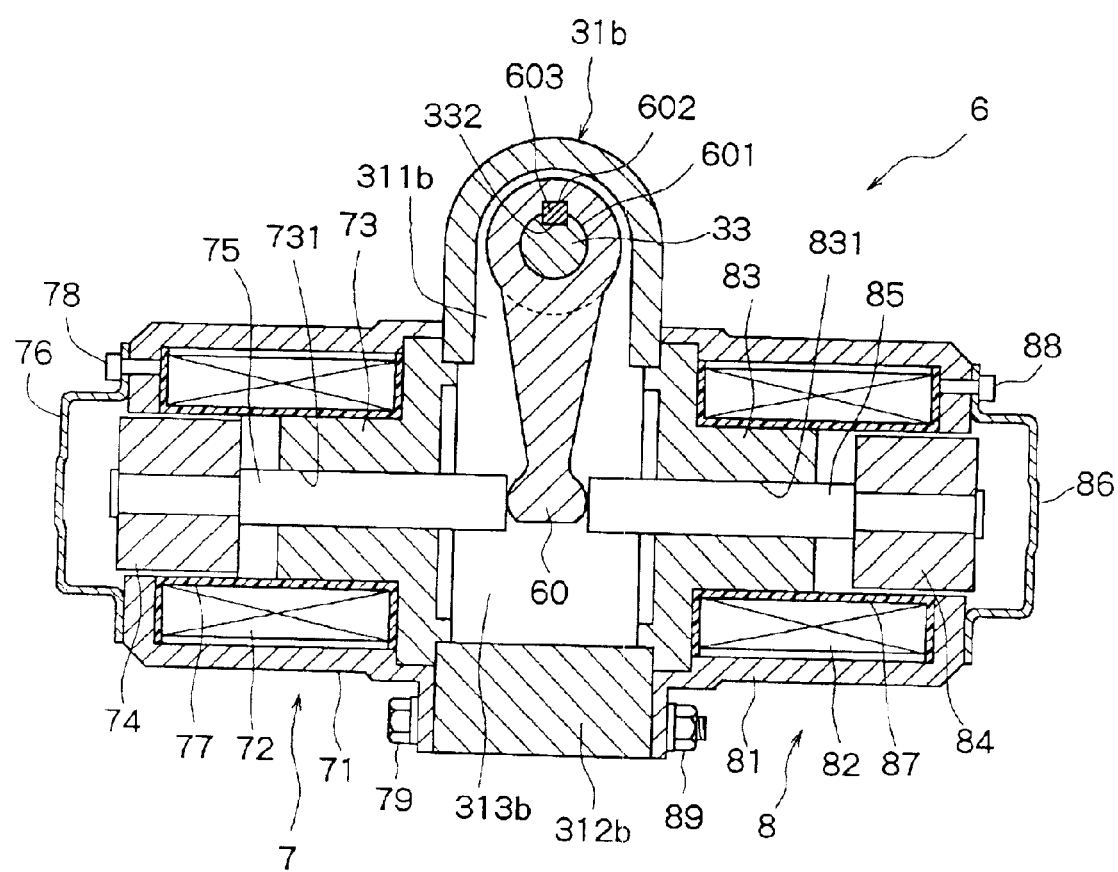
FIG. 3 is a sectional view along the line B—B in FIG. 1.

FIG. 1 is a sectional view illustrating an embodiment of the gear change device constituted according to the present invention, FIG. 2 is a sectional view along the line A—A in FIG. 1, and FIG. 3 is a sectional view along the line B—B in FIG. 1.

The gear change device 2 according to the illustrated embodiment is constituted by a select actuator 3 and a shift actuator 6. The select actuator 3 in the illustrated embodiment has three casings 31a, 31b and 31c formed in a cylindrical shape and coupled to each other. The casing 31a on the left side is opened at both ends thereof and has an opening 311a formed in the central lower portion thereof. The central casing 31b is opened at its both ends thereof and has an opening 311b formed in the lower portion at the right end thereof in FIGS. 1 and 2. The central casing 31b has a shift actuator-mounting portion 312b formed protruding downward. In the shift actuator-mounting portion 312b, an opening 313b communicating with the opening 311b is formed at right angles with the axial direction of the casing. The casing 31c on the right side is opened at its left end in FIGS. 1 and 2, and has an end wall 311c at the right end in FIGS. 1 and 2.

A control shaft 32 is arranged in the three casings 31a, 31b and 31c constituted as described above. The control shaft 32 is provided with a fitting portion 321 having an internal spline on the right side in FIGS. 1 and 2. An external spline 331 formed at the left end of a rotary shaft 33 is spline-fitted to the fitting portion 321 in such a manner as to slide in the axial direction. In FIGS. 1 and 2, the rotary shaft 33 is rotatably supported at its right side portion by a bearing 34 mounted on the right end of the casing 31c of the right side. The rotary shaft 33 thus supported is rotated in the direction of shift by a shift actuator 6 that will be described later.

The control shaft 32 thus spline-fitted to the rotary shaft 33 is arranged in the casings 31a, 31b and 31c so as to slide in the axial direction and to rotate. A shift lever 35 is mounted onto the control shaft 32. The shift lever 35 comprises a cylindrical mounting portion 351 and a lever portion 352 protruding from the mounting portion 351 in the radial direction, the mounting portion 351 being spline-fitted to the control shaft 32. The mounting portion 351 of the shift lever 35 thus spline-fitted to the control shaft 32 is limited from moving in the axial direction by a snap ring 36 mounted on the control shaft 32. Therefore, the shift lever 35 operates, as one unit, together with the control shaft 32. Accordingly, the control shaft 32 mounting the shift lever 35 and the rotary shaft 33 constitute a shift lever support mechanism which supports the shift lever so as to slide in the axial direction and to rotate. As shown in FIG. 2, the lever portion 352 of the shift lever 35 is arranged inserting through the opening 311a formed in the lower portion of the left casing 31a. An end of a lever portion 352 that constitutes the shift lever 35 comes into suitable engagement with the shift blocks 301, 302, 303 and 304 that are arranged at the first select position SP1, at the second select position SP2, at the third select position SP3 and at the fourth select position SP4, and that constitute a shift mechanism of a transmission that is not shown. In the illustrated embodiment, the first select position SP1 is set at a reverse-first speed select position, the second select position SP2 is set at the second speed-third speed select position, the third select position SP3 is set at the fourth speed-fifth speed select position, and the fourth select position SP4 is set at the sixth speed select position.

In FIGS. 1 and 2, an electromagnetic solenoid 4 arranged coaxially with the control shaft 32 is mounted on the left end of the casing 31a. The electromagnetic solenoid 4 has a cylindrical casing 41, an electromagnetic coil 42 arranged in the casing 41, a fixed iron core 43 arranged in the electromagnetic coil 42, a moving iron core 44 arranged coaxially with the fixed iron core 43 being opposed to one end surface (left end surface in FIG. 1) of the fixed iron core 43, an operation rod 45 mounted on the moving iron core 44, and a cover 46 mounted on one end (left end in FIGS. 1 and 2) of the cylindrical casing 41.

The cylindrical casing 41 has, at one end thereof (left end in FIGS. 1 and 2), an end wall 411 having a hole 412 at the central portion thereof and is opened at the other end thereof (right end in FIGS. 1 and 2). The electromagnetic coil 42 is wound on an annular bobbin 47 made of a nonmagnetic material such as a synthetic resin or the like, and is arranged along the inner periphery of the casing 41. The fixed iron core 43 is formed of a magnetic material, has a flange portion 431 at the other end thereof (right end in FIGS. 1 and 2), and is mounted on the other end of the casing 41 (on the right end in FIGS. 1 and 2) via the flange portion 431. The moving iron core 44 is formed of a magnetic material, and is constituted to come into contact with, and separate away from, the fixed iron core 43 in the axial direction. The operation rod 45 is formed of a nonmagnetic material such as a stainless steel or the like and has, at one end thereof (left end in FIGS. 1 and 2), a small-diameter portion 451. The small-diameter portion 451 of the thus constituted operation rod 45 is inserted in the hole 441 formed in the central portion of the moving iron core 44 and is caulked at its one end to mount the operation rod 45 on the moving iron core 44. The other end of the operation rod 45 thus mounted on the moving iron core 44 is arranged penetrating through the hole 432 formed in the central portion of the fixed iron core 43 so as to slide in the axial direction, and its other end surface (right end surface in FIGS. 1 and 2) is constituted to come into contact with the left end surface of the control shaft 32. The cover 46 is mounted on one end of the casing 41 by using screws 48 to cover one end of the casing 41 and one end of the moving iron core 44.

The electromagnetic solenoid 4 according to the illustrated embodiment is constituted as described above. When an electric current is fed to the electromagnetic coil 42, the fixed iron core 43 is magnetized, the moving iron core 44 is attracted by the fixed iron core 43, whereby the moving iron core 44 produces a thrust, i.e., the operation rod 45 produces a thrust toward the right in FIGS. 1 and 2. The magnitude of the thrust produced by the moving iron core 44, i.e., produced by the operation rod 45 is determined by the amount of electric power fed to the electromagnetic coil 42.

The select actuator 3 of the illustrated embodiment has a select position-limiting mechanism 5 for limiting the position of the shift lever 35 to the first select position SP1, to the second select position SP2, to the third select position SP3 or to the fourth select position SP4 in cooperation with the magnitude of thrust produced by the moving iron core 44, i.e., by the operation rod 45 that varies in response to the amount of electric power fed to the electromagnetic coil 42 of the electromagnetic solenoid 4. The select position-limiting mechanism 5 has the left casing 31a and the central casing 31b, the first moving ring 51, the second moving ring 52 and the third moving ring 53 arranged in such a manner as to slide along the control shaft 32 and the rotary shaft 33. The first moving ring 51 is limited from moving toward the left in FIGS. 1 and 2 by a snap ring 58 mounted on the inner peripheral surface of the left casing 31a. The first compression coil spring 54 is arranged between the first moving ring 51 and the second moving ring 52, and the second compression coil spring 55 is arranged between the second moving ring 52 and a stopper 59 which is slidably fitted onto the rotary shaft 33 and is positioned at a stepped portion 314b formed on the inner periphery of the central casing 31b. Further, the third compression coil spring 56 is arranged between the second moving ring 52 and the third moving ring 53, and the fourth compression coil spring 57 is arranged between the third moving ring 53 and the stopper 59. The spring force of the second compression coil spring 55 is selected to be greater than the spring force of the first compression coil spring 54, and the spring force of the fourth compression coil spring 57 is selected to be greater than the spring force of the third compression coil spring 53. Due to the spring forces of the first compression coil spring 54 and the second coil spring 55, therefore, the first moving ring 51 is thrusted leftward in FIGS. 1 and 2 to come into contact with the snap ring 58. In FIGS. 1 and 2, the first moving ring 51 is brought, at its left end, into engagement with an engaging portion 322 provided on the outer periphery of the control shaft 32.

The select actuator 3 of the illustrated embodiment is constituted as described above. The operation will be described hereinafter.

When no electric power is fed (no electric current is fed) to the electromagnetic coil 42 of the electromagnetic solenoid 4 constituting the select actuator 3, the first moving ring 51, second moving ring 52 and third moving ring 53 constituting the select position-limiting mechanism 5 are positioned in states shown in FIGS. 1 and 2, where the spring forces are balanced among the first compression coil spring 54, second compression coil spring 55, third compression coil spring 56 and fourth compression coil spring 57. At this moment, the moving iron core 44 and the operation rod 45 constituting the electromagnetic solenoid 4 are brought to positions shown in FIGS. 1 and 2, so that the right end surface of the operation rod 45 comes into contact with the left end surface of the control shaft 32. The control shaft 32 is brought to the first select position (SP1) at which an engaging portion 322 provided on the outer periphery of the control shaft 32 comes into contact with the first moving ring 51. In this embodiment, the first select position (SP1) is set to the reverse-first speed select position as described above. In case the electromagnetic solenoid 4 becomes defective, therefore, the select actuator 3 brings the shift lever 35 to the reverse-first speed select position. Namely, in case the electromagnetic solenoid 4 becomes out of order, the transmission can be shifted to the first speed gear with which the vehicle starts moving or to the reverse gear, and the vehicle can be driven to a predetermined place such as a repair shop.

Figure 4:
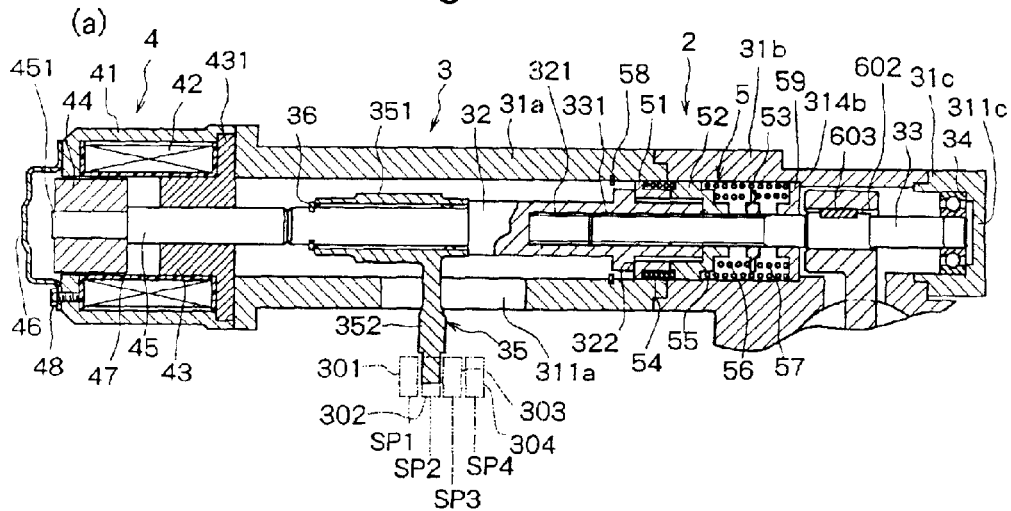
FIG. 4 is a view illustrating the operation of a select actuator that constitutes the gear change device shown in FIG. 1.
Figure 4:
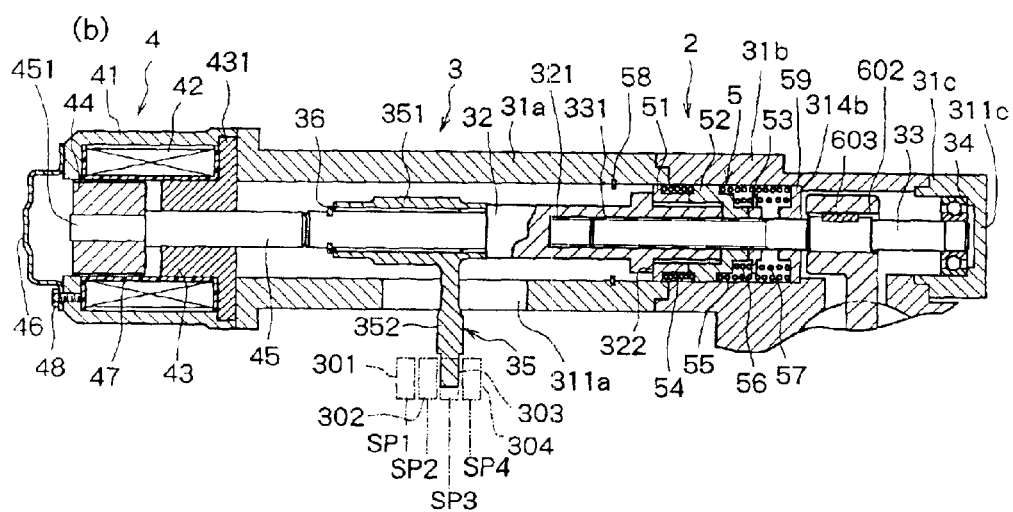
Figure 4:
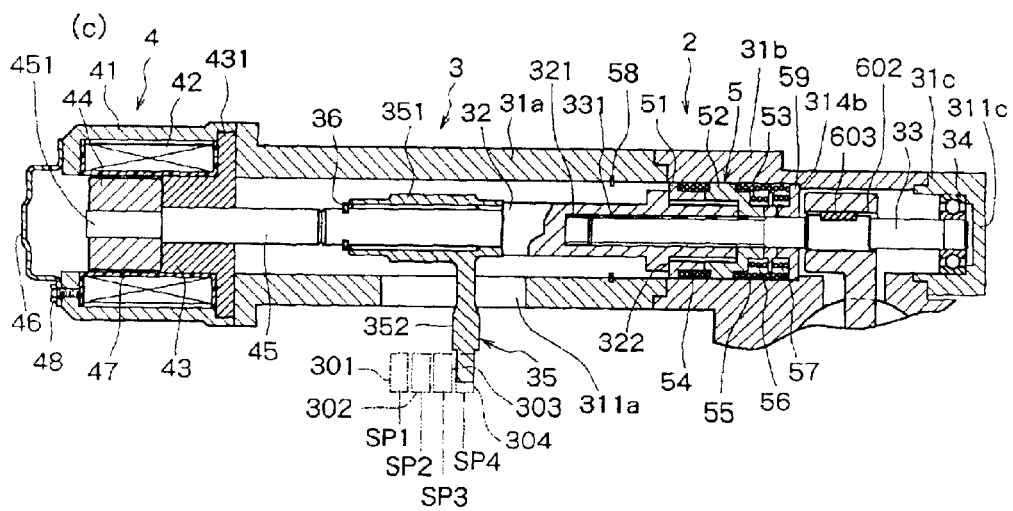

When a voltage of, for example, 2 V is applied to the electromagnetic coil 42 constituting the electromagnetic solenoid 4 in a state shown in FIGS. 1 and 2, the moving iron core 44 is attracted by the fixed iron core 43, whereby the moving iron core 44 and the operation rod 45 produce a thrust toward the right in the drawings. As a result, as shown in FIG. 4(a), the moving iron core 44, operation rod 45, control shaft 32 and first moving ring 51 move toward the right in the drawing overcoming the spring force of the first compression coil spring 54. Here, the second moving ring 51 is not displaced since the spring force of the second compression coil spring 55 is greater than the spring force of the first compression coil spring 54. The moving iron core 44, operation rod 45, control shaft 32 and first moving ring 51 come to a halt at a position at which the first moving ring 51 comes into contact with the second moving ring 52. Therefore, the shift lever 35 mounted on the control shaft 32 is brought to the second select position (SP2) shown in FIG. 4(a).

Next, when a voltage of, for example, 4 V is applied to the electromagnetic coil 42 constituting the electromagnetic solenoid 4, the moving iron core 44 and the operation rod 45 produce an increased thrust toward the right. As a result as shown in FIG. 4(b), the moving iron core 44, operation rod 45 and control shaft 32 move toward the right in the drawing in a state where the first moving ring 51 is in contact with the second moving ring 52, overcoming the spring force of the second compression coil spring 55. The moving iron core 44, operation rod 45, control shaft 32 and first moving ring 51 come to a halt at a position at which the second moving ring 52 comes into contact with the third moving ring 53. Therefore, the shift lever 35 mounted on the control shaft 32 is brought to the third select position (SP3) shown in FIG. 4(b).

Next, when a voltage of, for example, 8 V is applied to the electromagnetic coil 42 constituting the electromagnetic solenoid 4, the moving iron core 44 and the operation rod 45 produce a further increased thrust toward the right. As a result, as shown in FIG. 4(c), the moving iron core 44, operation rod 45 and control shaft 32 move toward the right in the drawing in a state where the second moving ring 52 is in contact with the third moving ring 53, overcoming the spring forces of the second compression coil spring 55 and of the fourth compression coil spring 57. The moving iron core 44, operation rod 45, control shaft 32 and first moving ring 51 come to a halt at a position at which the third moving ring 53 comes into contact with the stopper 59. Therefore, the shift lever 35 mounted on the control shaft 32 is brought to the fourth select position (SP4) shown in FIG. 4(c).

As described above, the select actuator 3 constituting the gear change device 2 actuates the control shaft 32 which mounts the shift lever 35 integrally thereon by utilizing the electromagnetic solenoid 4, and features improved durability since it has no rotary mechanism. Unlike the actuator that uses an electric motor, further, the select actuator 3 does not require a speed reduction mechanism constituted by a ball-screw mechanism or a gear mechanism, and can be constituted in a compact size and operated at an increased speed. Besides, the illustrated select actuator 3 has a select position-limiting mechanism, and is so constituted that the control shaft 32 is brought to any one of a plurality of select positions according to the thrust produced by the operation rod 45 that varies in response to the amount of electric power fed to the electromagnetic coil 42. Thus, any one of the plurality of select positions can be selected by using a single electromagnetic solenoid, enabling the gear change device to be constructed in a compact size and at a low cost.

Next, the shift actuator 6 will be described with reference chiefly to FIG. 3.

The illustrated shift actuator 6 has the first electromagnetic solenoid 7 and the second electromagnetic solenoid 8 for actuating an operation lever 60 mounted on the rotary shaft 33 of the select actuator 3. The operation lever 60 has a hole 601 to be fitted to the rotary shaft 33 in a base portion thereof, and is so constituted that it is rotated integrally with the rotary shaft 33 by fitting a key 603 into a key way 602 formed in the inner peripheral surface of the hole 601 and into a key way 332 formed in the outer peripheral surface of the rotary shaft 33. The operation lever 60 is arranged inserting through the opening 311b formed in the lower portion of the central casing 31b, and an end (lower end) thereof reaches the central portion of the opening 313b formed in the shift actuator-mounting portion 312b.

Next, the first electromagnetic solenoid 7 will be described.

The first electromagnetic solenoid 7 is constituted in the same manner as that of the electromagnetic solenoid 4 described above, and comprises a cylindrical casing 71, an electromagnetic coil 72 wound on an annular bobbin 77 which is arranged in the casing 71 and is made of a nonmagnetic material such as a synthetic resin or the like, a fixed iron core 73 which is arranged in the electromagnetic coil 72 and is formed of a magnetic material, a moving iron core 74 which is formed of a magnetic material and is arranged coaxially with the fixed iron core 73 being opposite to one end surface of the fixed iron core 73, an operation rod 75 which is formed of a nonmagnetic material such as a stainless steel or the like and is arranged to slide in the axial direction with its one end being mounted on the moving iron core 74 and its other end passing through a hole 731 formed in the central portion of the fixed iron core 73, and a cover 76 mounted on one end of the cylindrical casing 71 with screws 78. In the thus constituted first electromagnetic solenoid 7, the casing 71 is mounted by bolts 79 on one side surface of the shift actuator-mounting portion 312b provided in the central casing 31b, and the end of the operation rod 75 is brought into engagement with the end portion (lower end portion) of the operation lever 60. When an electric current is fed to the electromagnetic coil 72 of the first electromagnetic solenoid 7 which is thus mounted on one side of the shift actuator-mounting portion 312b, the moving iron core 74 is attracted by the fixed iron core 73. As a result, the operation rod 75 mounted on the moving iron core 74 moves toward the right in FIG. 3, and the end thereof acts on the operation lever 60, causing it to be turned on the rotary shaft 33 in the counterclockwise direction in FIG. 3. Thereby, the control shaft 32 spline-fitted to the rotary shaft 33 turns, and the shift lever 35 mounted on the control shaft 32 is shifted in the first direction.

Next, the second electromagnetic solenoid 8 will be described.

The second electromagnetic solenoid 8 is arranged being opposed to the first electromagnetic solenoid 7, and is mounted on the other side surface of the shift actuator-mounting portion 312b. Like the first electromagnetic solenoid 7, the second electromagnetic solenoid 8, too, comprises a cylindrical casing 81, an electromagnetic coil 82 wound on an annular bobbin 87 which is arranged in the casing 81 and is made of a nonmagnetic material such as a synthetic resin or the like, a fixed iron core 83 which is arranged in the electromagnetic coil 82 and is formed of a magnetic material, a moving iron core 84 which is formed of a magnetic material and is arranged coaxially with the fixed iron core 83 being opposite to one end surface of the fixed iron core 83, an operation rod 85 which is formed of a nonmagnetic material such as a stainless steel or the like and is arranged to slide in the axial direction with its one end being mounted on the moving iron core 84 and its other end passing through a hole 831 formed in the central portion of the fixed iron core 83, and a cover 86 mounted on one end of the cylindrical casing 81 with screws 88. In the thus constituted second electromagnetic solenoid 8, the casing 81 is mounted by bolts 89 on the other side surface of the shift actuator-mounting portion 312b, and the end of the operation rod 85 is brought into engagement with an end portion (lower end portion) of the operation lever 60. When an electric current is fed to the electromagnetic coil 82 of the second electromagnetic solenoid 8 which is thus mounted on the other side surface of the shift actuator-mounting portion 312b, the moving iron core 84 is attracted by the fixed iron core 83. As a result, the operation rod 85 mounted on the moving iron core 84 moves toward the left in FIG. 3, and the end thereof acts on the operation lever 60, causing it to be turned on the rotary shaft 33 in the clockwise direction in FIG. 3. Thereby, the control shaft 32 spline-fitted to the rotary shaft 33 turns, and the shift lever 35 mounted on the control shaft 32 is shifted in the second direction.

Being constituted as described above, the gear change device according to the present invention exhibits action and effect as described below.

That is, according to the present invention, the select actuator that constitutes the gear change device is constituted by a cylindrical casing, a shift lever support mechanism arranged in the casing to support the shift lever in such a manner as to slide in the axial direction and to rotate, and an electromagnetic solenoid for operating the shift lever in the axial direction which is the direction of selection, and has improved durability since it has no rotary mechanism. Unlike the actuator that uses an electric motor, further, the select actuator does not require a speed reduction mechanism such as a ball-screw mechanism or a gear mechanism, and can be constituted in a compact size and operates at an increased speed. Besides, the select actuator has a select position-limiting mechanism, and is so constituted that the control shaft is brought to any one of a plurality of select positions according to the thrust produced by the operation rod that varies in response to the amount of electric power fed to the electromagnetic coil. Thus, any one of the plurality of select positions is selected by using a single electromagnetic solenoid, enabling the select actuator to be constructed in a compact size and at a low cost.

I claim:

1. A gear change device comprising a shift lever, a select actuator for actuating the shift lever in the direction of selection to engage shift blocks at a plurality of select positions corresponding to a plurality of gears of a transmission, and a shift actuator for actuating the shift lever in the direction of shift, wherein:

said select actuator comprises a cylindrical casing, a shift lever support mechanism arranged in said casing to support said shift lever in such a manner as to be slidable in the axial direction and to be rotatable, an electromagnetic solenoid for operating said shift lever in the axial direction which is the direction of selection, and a select position-limiting mechanism for limiting the operation position of the shift lever to one of a plurality of select positions according to the amount of thrust produced in response to the amount of electric power fed to the electromagnetic coil of said electromagnetic solenoid;

said select position-limiting mechanism causes said shift lever to be brought to the select position of a first gear position when no electric current is being fed to the electromagnetic coil of said electromagnetic solenoid; and said shift actuator is adapted to rotate said shift lever support mechanism in the direction of shift.

2. A gear change device according to claim 1, wherein said shift lever support mechanism comprises a control shaft for mounting said shift lever and a rotary shaft which is spline-fitted to said control shaft in such a manner as to slide in the axial direction and which is rotatably supported by said casing.

3. A gear change device according to claim 1, wherein the transmission has a plurality of gears, and the first gear position corresponds with the lowest gear of the transmission.

* * * * *